(12) United States Patent
Boscolo

(10) Patent No.: US 6,798,156 B2
(45) Date of Patent: Sep. 28, 2004

(54) METHOD FOR MINIMISING THE PHASE ERRORS DURING THE DRIVING OF AN ELECTRIC MOTOR, AND A CIRCUIT USING THE METHOD THEREOF

(75) Inventor: Michele Boscolo, Sottomarina (VE) (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/175,451

(22) Filed: Jun. 18, 2002

(65) Prior Publication Data

US 2002/0190675 A1 Dec. 19, 2002

(30) Foreign Application Priority Data

Jun. 18, 2001 (EP) .............................................. 01830401

(51) Int. Cl.[7] ................................................. H02P 5/00
(52) U.S. Cl. ........................ 318/254; 318/138; 318/439; 318/721; 318/603; 318/605
(58) Field of Search ................................ 318/254, 138, 318/439, 721, 603, 605

(56) References Cited

U.S. PATENT DOCUMENTS 5,193,146 A * 3/1993 Kohno ........................ 388/811
5,850,130 A * 12/1998 Fujisaki et al. ............. 318/439
6,191,545 B1 * 2/2001 Kawabata et al. .......... 318/439

FOREIGN PATENT DOCUMENTS

| DE | 199 51 364 A | 5/2001 |
| EP | 0 955 722 A | 11/1999 |

* cited by examiner

Primary Examiner—Rita Leykin
(74) Attorney, Agent, or Firm—Lisa K. Jorgenson; Stephen Bongini; Fleit, Kain, Gibbons, Gutman, Bongini & Bianco P.L.

(57) ABSTRACT

The present invention relates to a method and a circuit using the method thereof for minimising the phase errors during the driving of an electric motor, and a circuit using the method thereof, having a stator winding, a permanent magnet rotor assembly, and devices able to sense a rotor position, which comprises the following steps: a) generating of a rotor position signal (10, 14, 39), by means of said devices able to sense said rotor position; b) detecting at least two information from at least two edges (11, 12; 15, 16) of said rotor position signal (10, 14, 39) inside a measure period; c) generating a driving signal (9, 13, 38), in function of said at least two information (11, 12; 15, 16) inside the measure period, so as to follow the rotor velocity.

24 Claims, 5 Drawing Sheets

US 6,798,156 B2

METHOD FOR MINIMISING THE PHASE ERRORS DURING THE DRIVING OF AN ELECTRIC MOTOR, AND A CIRCUIT USING THE METHOD THEREOF

BACKGROUND OF THE INVENTION

1. Field of the Invention

The present invention relates to a method for minimising the phase errors during the driving of an electric motor, and a circuit using the method thereof, particularly but not exclusively for minimising the phase errors during the driving of a brushless motor, driven by prefixed driving signals, such as sinusoidal driving signals.

2. Description of Related Art

A DC brushless motor is a synchronous motor and it has a stator winding, a permanent magnet rotor assembly, and internal or external devices to sense rotor position. The rotor assembly may be internal or external to the stator in the brushless motors.

A characteristic of the brushless motor is that the combination of an inner permanent magnet rotor and outer windings offers the advantages of lower rotor inertia and more efficient heat dissipation with respect other type of electric motors.

Moreover, the elimination of brushes reduces maintenance, increases life and reliability, and reduces acoustic noise and EMI (Electromagnetic Interference).

However, the brushless motor, for its best way of working, needs of a well defined relationship among the driving signals and the rotor position. In fact the sensing devices provide signals for electronically switching or commutating of the stator windings in a proper sequence to maintain rotation of the magnet rotor assembly.

Therefore, the rotor position sensing is essential for proper commutation of the brushless motor and to detect said rotor position a few solutions are used, such as Hall effect switches (using Hall effect sensors) or induced BEMF (Backward Electromotive Force).

Once deduced the rotor position, that is once deduced the velocity of the rotor of the brushless motor, said information will be used to provide some driving sinusoidal signals (or pseudo sinusoidal signals) having a suitable frequency.

Usually, the sinusoidal driving systems are used to minimize the ripples of torque and to minimize the acoustic noise.

As stated before the brushless motor, for its best way of working, needs of a well defined relationship among the driving signals and the rotor position and, in fact, in the known sinusoidal driving systems, said relationship is based on the reading of the previous electric period so as to determine the frequency of the actual driving signal to control the electric motor.

Such a nature of approach, in the case of a steady state condition, that is in the case of a constant velocity of the rotor, does not introduce any phase error, because all the electric periods come in succession, having an equal duration, if in a first approximation the electric motor asymmetries are neglected; but in presence of abrupt accelerations or decelerations, the phase error between the driving signal and the rotor position is particularly evident and it causes an increasing of the acoustic noise, an increasing of the vibrations and an increasing of the EMI.

Such of problems are particularly palpable in applications wherein the motor is connected to a load having a low inertia, such as, for example, in Compact Disc (CD) or Digital Versatile Disk (DVD) or similar.

With reference to FIG. 1, a relationship between a driving signal and the rotor position in the case of steady state according to the prior art is shown.

In fact, as shown in such a FIG. 1, a driving signal 1, or it can be also called as phase current, and a rotor position signal 2 in the condition of constant velocity of the rotor are depicted.

In fact, the rotor position signal 2 states that the electric motor (not shown in FIG. 1) has a constant frequency or a constant angular velocity, that is its electric periods $T_e(n)$, indicated as $T_e(n)$, $T_e(n-1)$, $T_e(n-2)$ etc., have the same duration.

In fact, the electric periods are equal each other, by the following relationship: $T_e(n)=T_e(n-1)=T_e(n-2)$, etc.

In this embodiment, the electric periods $T_e(n)$, $T_e(n-1)$, $T_e(n-2)$ of the electric motor are deduced between two rising edge of the rotor position signal 2 and they are used to compute the period $T_s(n)$ of the driving signal 1.

Therefore, the period $T_s(n)$ represents the period forced by the control circuit to the electric motor.

In fact, one of the driving technique to control the electric motor, foresees that the period $T_s(n)$ of the driving signal 1 is based on the reading of the previous electric period $T_e(n-1)$ of the electric motor deduced by the rotor position signal 2, that is the system, in function of the reading of the previous electric period of the electric motor, provides the actual driving signal 1.

In other word, the period $T_e(n-2)$ of the electric motor is used to compute the period $T_s(n-1)$ of the driving signal 1, the period $T_e(n-1)$ is used for $T_s(n)$ and so on.

This embodiment, as heretofore stated, does not arise distortions only if the electric periods $T_e(n)$, $T_e(n-1)$, $T_e(n-2)$ etc., have the same duration.

In the case of abrupt accelerations or decelerations some distortions are induced because the measure of the electric period $T_e(n)$ changes continuously in the time. Therefore the system, basing its decision for the generation of the driving signal period $T_s(n)$ on the previous electric period $T_e(n-1)$, will make a phase error between the actual driving signal, that is the period forced by the control circuit, and the ideal driving signal.

In fact, as is shown in FIG. 2, wherein the same relationship of FIG. 1 in the case of abrupt acceleration according to the prior art is shown, and as is shown in FIG. 3, wherein the same relationship of FIG. 1 in the case of abrupt deceleration according to the prior art is shown, it is possible to note in which way the driving signal 1 is modified.

In particularly, referring to the FIG. 2, the system forces an estimated period $T_{est}(n)$ of the driving signal 3 in function of the previous electric period $T_e(n-1)$ of the rotor position signal 4.

It is to be noted that in this specific embodiment the rotor position signal 4 is equal to the electric period of the motor.

It is to be noted also that the estimated period $T_{est}(n)$ is not completely applied to the brushless motor, because the angular velocity of the rotor is incrementing instant by instant and therefore the rising edge of the rotor position signal 4 arrives with few instants before the predicted instant.

In this way, the estimated period $T_{est}(n)$ is bigger than the actual driving signal period $T_s(n)$, by a factor $\Delta_{acc}(t)$.

In fact, with the factor $\Delta_{acc}(t)$ is depicted the difference between the estimated driving signal period $T_{est}(n)$, and the actual electric period $T_e(n)$.

In particularly, referring to the FIG. 3, the system forces an estimated period $T_{est}(n)'$ of the driving signal 6 in function of the electric period $T_e(n-1)'$ of the rotor position signal 7.

It is to be noted that in this specific embodiment the rotor position signal 7 is equal to the electric period of the motor.

It is to be noted also that the estimated period $T_{est}(n)'$ can not complete the actual electric period $T_e(n)'$, because the angular velocity of the rotor is decrementing instant by instant and therefore the rising edge 8 of the rotor position signal 7 arrives few instants after the predict instant.

In this way, the estimated period $T_{est}(n)'$ is lower than the actual driving signal period $T_s(n)'$, by a factor $\Delta_{dec}(t)$.

In fact, with the factor $\Delta_{dec}(t)$ is depicted the difference between the actual electric period $T_e(n)'$ and the actual driving signal $T_{est}(n)'$.

Referring to the FIG. 3, it is to be noted that the driving signal 6 ends its cycle θ, made by of 360° degrees, before the arrival of the rising edge 8 of the rotor position signal 7, and in the specific embodiment, the committed phase error α, during the driving of the brushless motor, can achieve high values, such as, for example, α=90° degrees.

The FIGS. 2 and 3 are related to a system wherein the generation of the driving signals 3 or 6 continues unchanged until the arrival of the next rising edge 5 or 8 of the respective rotor position signal 4 or 7.

Another embodiment, well known to a skilled person, is that in which, the driving signal is produced for a maximum duration of 360° degrees.

SUMMARY OF THE INVENTION

In view of the state of the art described, it is in object of the present invention to solve the aforementioned problems, particularly to solve the phase errors committed during the driving of the brushless motors driven by means of prefixed driving signals in presence of abrupt accelerations or decelerations.

According to the present invention, such object is attained by a method for minimising the phase errors during the driving of an electric motor, having a stator winding, a permanent magnet rotor assembly, and devices able to sense a rotor position, characterised by comprising the following steps: a) generating of a rotor position signal, by means of said devices able to sense said rotor position; b) detecting at least two information from at least two edges of said rotor position signal inside a measure period; c) generating a driving signal, in function of said at least two information inside the measure period, so as to follow the rotor velocity.

According to the present invention, such object is also attained by a circuit for minimising the phase errors during the driving of an electric motor, having a stator winding, a permanent magnet rotor assembly, detecting means able to detect a rotor position, storing means able to store a number of samples of an ideal driving profile, addressing means able to address one of that stored samples in said storing means, characterised in that said detecting means output a rotor position signal, used for pointing to said stored samples of said ideal driving profile in said storing means by means of said adding means and used by means of a frequency multiplier means so as to provide a scanning frequency signal able to scan said samples in said storing means.

Thanks to the present invention it is possible to realise a method and a circuit able to reduce the acoustic noise, the vibrations and the EMI of a brushless motor in presence of abrupt accelerations or decelerations.

BRIEF DESCRIPTION OF THE DRAWINGS

The features and the advantages of the present invention will be made evident by the following detailed description of few its particular embodiments, illustrated as not limiting example in the annexed drawings, wherein.

DETAILED DESCRIPTION OF PREFERRED EMBODIMENTS

The Applicant has found that to minimise the committed phase errors during the driving of a brushless motor it is necessary or to detect more information of the rotor position inside an electric period of the motor or to measure the acceleration of the rotor of the motor, as hereinafter described in detail.

Figure 1:
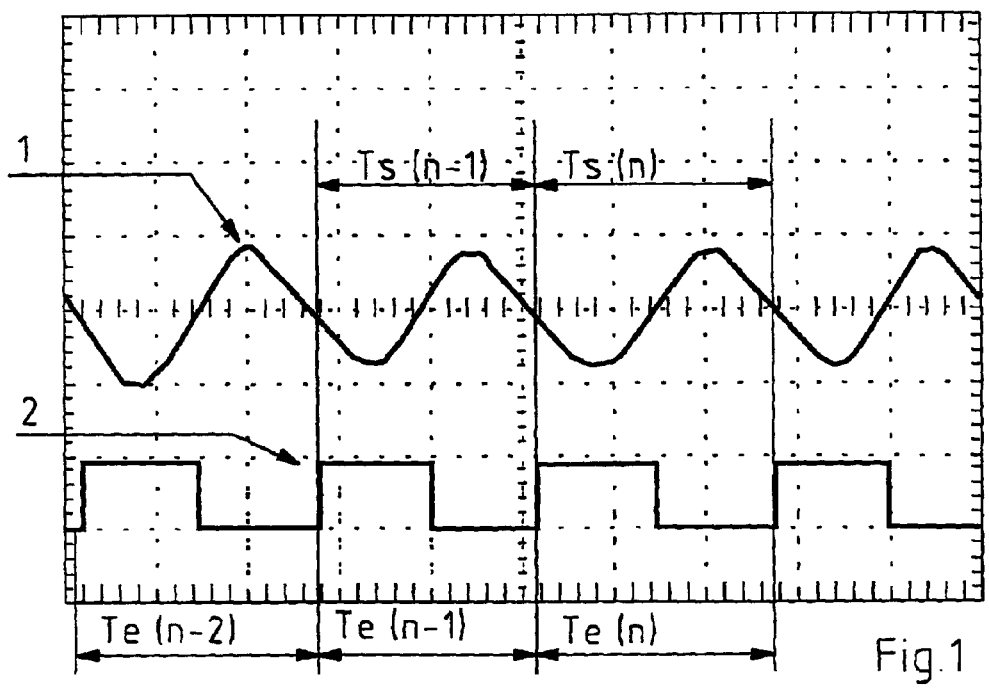
FIG. 1 shows a relationship between a driving signal and the rotor position in the case of steady state according to the prior art.
Figure 2:
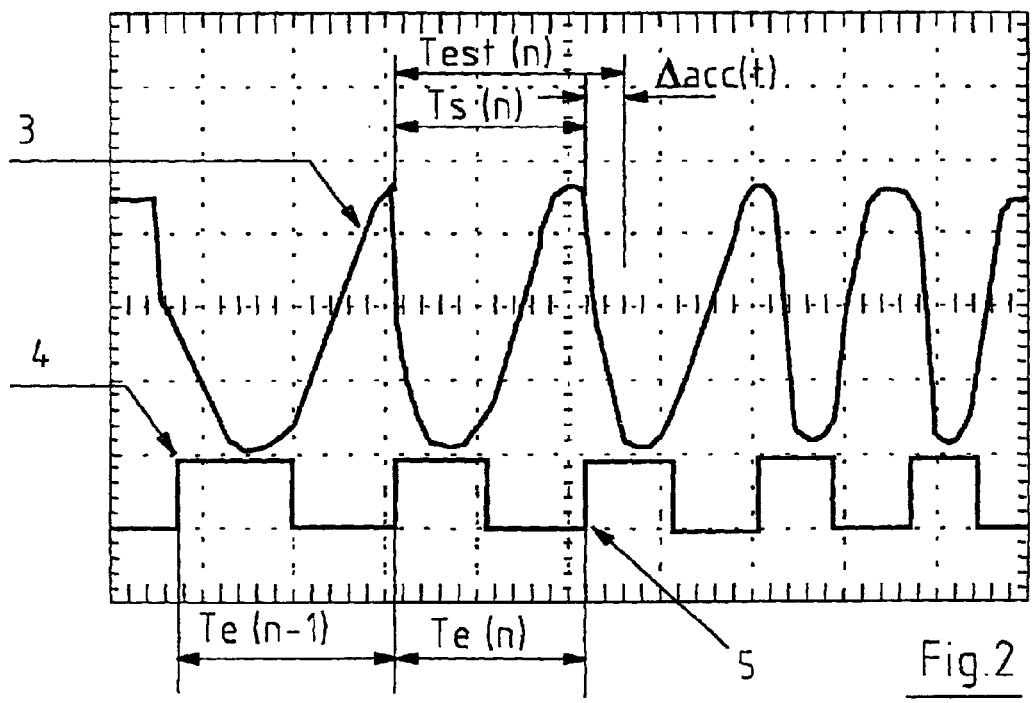
FIG. 2 shows the same relationship of FIG. 1 in the case of abrupt acceleration according to the prior art.
Figure 3:
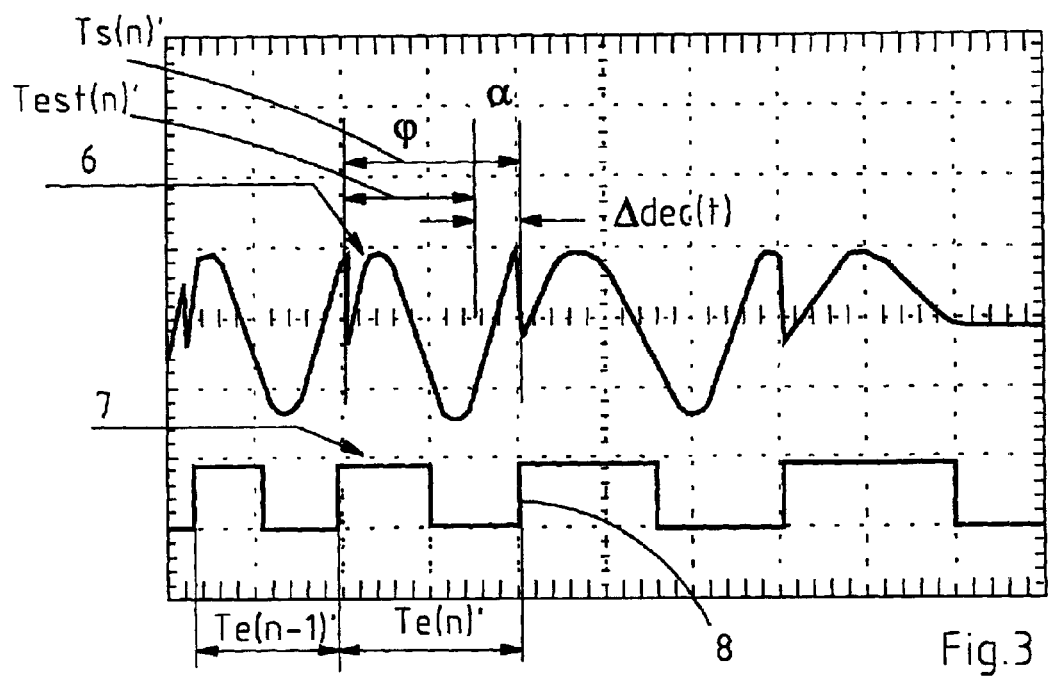
FIG. 3 shows the same relationship of FIG. 1 in the case of abrupt deceleration according to the prior art.
Figure 4:
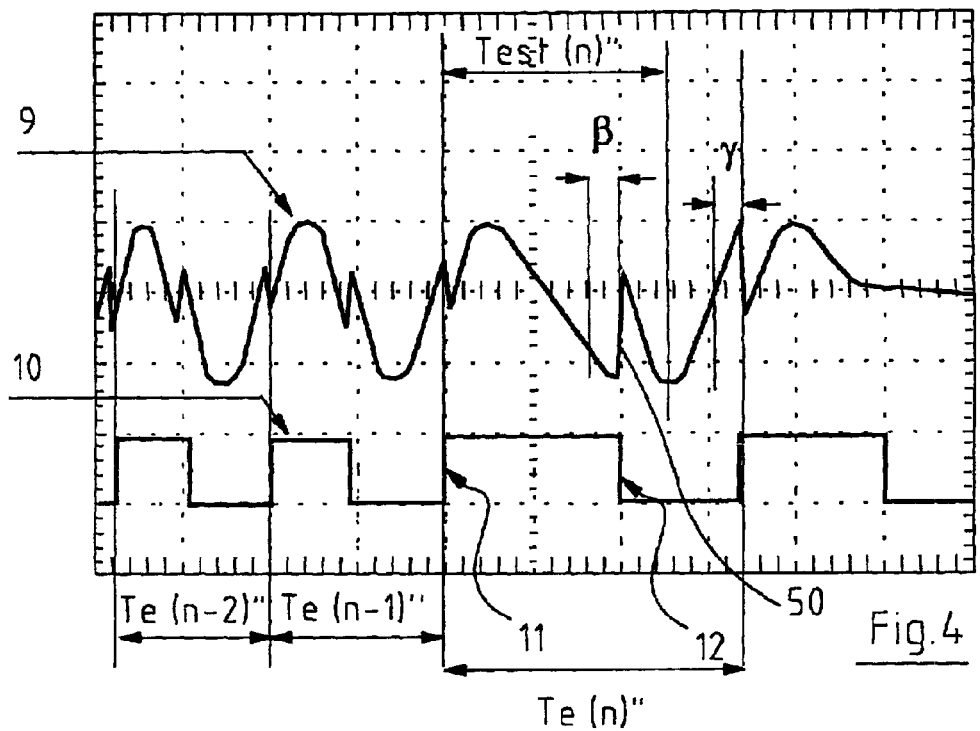
FIG. 4 shows the relationship between a driving signal and the rotor position signal in the case of abrupt deceleration according to a first embodiment of the present invention.

In FIG. 4 the relationship between a driving signal and the rotor position signal in the case of abrupt deceleration according to a first embodiment of the present invention is shown.

The relationship described in FIG. 4 refers to a system having a sinusoidal driving signal 9 derived by a rotor position signal 10, which provides the information of the angular position of the rotor of the brushless motor (not shown in FIG. 4).

By assuming a system having a sinusoidal driving signal derived by two information of the rotor position inside of an electric period $T_e(n)"$, that is means (not shown in FIG. 4) able to detect two different positions of the rotor every 180° degrees, for example, it is possible to minimise the phase error α.

In this first embodiment, the system forces an estimated driving signal $T_{est}(n)"$ at the start of the rising edge 11 of the rotor position signal 10. Said estimated driving signal $T_{est}(n)"$ has a frequency equal to the frequency of the previous electric period $T_e(n-1)"$, as taught in the prior art systems.

Therefore, by detecting the rising edge 11, the inventive system provides the estimated driving signal $T_{est}(n)"$ starting from a value "sin(x)" and by detecting the falling edge 12 the system forces the same estimated driving signal $T_{est}(n)"$ to start from a new value "sin(x+K*φ)", wherein K is a constant and φ a phase angle.

In the specific embodiment of FIG. 4, φ is equal to 180° degrees.

Referring to FIG. 4, it is possible to deduce that in coincidence of the falling edge 12 of the rotor position signal 10, the estimated driving signal $T_{est}(n)$" is stopped, point 50, and it is forced to assume the new value "$\sin(x+K*\phi)$". This is a re-synchronisation operation of the estimated driving signal $T_{est}(n)$" to the last available information, that is to the falling edge 12.

In the other word, the driving signal 9 is generated in function of two information 11 and 12, belonging at the rotor position signal 10. Particularly the first information 11 provides a start point of the first portion of the estimated driving signal $T_{est}(n)$", having a frequency equal to the previous electric period $T_e(n-1)$", and the second information 12 provides another start point of the second portion of the estimated driving signal $T_{est}(n)$", having again the frequency equal to the previous electric period $T_e(n-1)$" plus the phase angle $\phi=180°$.

Therefore, by using such an embodiment and referring to the FIG. 4, it is to be noted that in condition of abrupt deceleration the phase angles $\beta$ and $\gamma$ are lower than the phase angle $\alpha$, and then the inventive system reduces the overall phase error of the system.

Obviously, the phase angle $\phi$ can assume different values, such as, for example, 120° or 60° degrees. This means that the detection of the rotor position is made, respectively, three times or six times inside an electric period $T_e(n)$", that is a finest detection of the rotor position is realised.

By way of example, in the case of two information inside the electric period $T_e(n)$", the phase angle is equal to 180° degrees and the second information is used to re-synchronise the estimated driving signal $T_{est}(n)$".

In the case of six information inside the electric period $T_e(n)$", that is the phase angle is equal to 60° degrees, the estimated driving signal $T_{est}(n)$" is re-synchronised, for the whole round angle, six times, each one of which with the respective actual motor position information, that is the first time the estimated driving signal $T_{est}(n)$" is re-synchronised to "$\sin(x+60)$", the second time to "$\sin(x+120°)$", and so on.

Generalising, the phase angle can assume a plurality of values according to the following formula:

$$\phi=360°/n \qquad (1)$$

where "n" is the wanted number of information deduced inside the electric period or in a measure period, whereas the measure period can be equal at least to an electric period $T_e(n)$.

Figure 5:
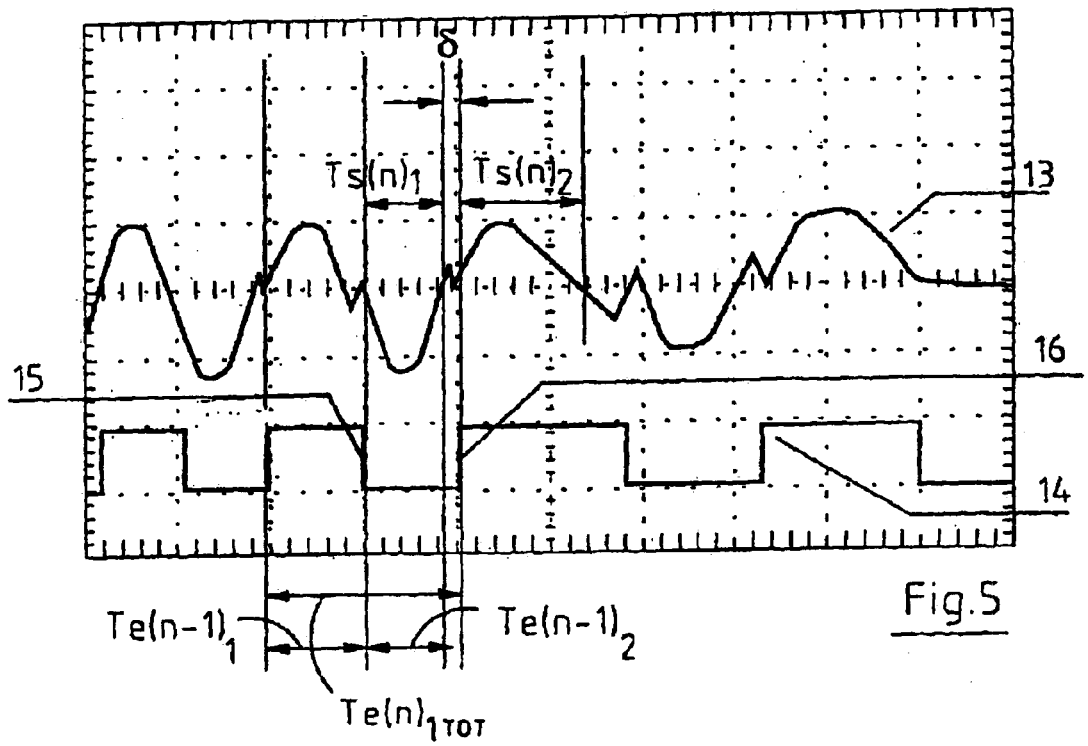
FIG. 5 shows the relationship between a driving signal and the rotor position signal in the case of abrupt deceleration according to a second embodiment of the present invention.

In FIG. 5 the relationship between a driving signal and the rotor position signal in the case of abrupt deceleration according to a second embodiment of the present invention is shown.

The relationship described in FIG. 5 refers again to a system having a sinusoidal driving signal 13 derived by a rotor position signal 14, which provides the information of position of the rotor of the brushless motor (not shown in FIG. 5).

By assuming a system having a sinusoidal driving signal 13 divided into two half periods $T_s(n)_1$ and $T_s(n)_2$ that are deduced, respectively, from the duration of previous half periods $T_e(n-1)_1$ and $T_e(n-1)_2$ of the rotor position signal 14 of electric period $T_e(n-1)_{TOT}$, it is possible to reduce the overall phase error.

In other word the half period of the driving signal $T_s(n)_1$ is deduced by the half period of the previous electric period $T_e(n-1)_1$ and the half period of the driving signal $T_s(n)_2$ is deduced by the previous half period of the electric period $T_e(n-1)_2$.

In fact, the inventive system in this second embodiment, by detecting the falling edge 15 of the rotor position signal 14, forces the generation of the driving signal 13 starting from a value "$\sin(x)$", having an half period $T_s(n)_1$ equal to the previous half electric period $T_e(n-1)_1$, that is the same frequency, and by detecting the rising edge 16 of the rotor position signal 14, the system forces the same driving signal 13 to assume a new value "$\sin(x+K*\phi)$" (wherein $\phi$ is the phase angle and K a constant), having a half period $T_s(n)_2$ equal to the previous half electric period $T_e(n-1)_2$, that is the same frequency.

In other word, in this second embodiment, the system forces an estimated driving signal $T_s(n)_1$ having the first start point in function of the falling edge 15, with a frequency equal to the previous half electric period $T_e(n-1)_1$ and the system also forces the estimated driving signal $T_s(n)_2$ having the second start point in function of the rising edge 16, with a frequency equal to the previous half electric period $T_e(n-1)_2$.

Further said driving signals $T_s(n)_1$ and $T_s(n)_2$ are re-synchronised respectively, in function of said falling edge 15 and rising edge 16.

Generalising, the driving signal 13 is forced to a new value "$\sin(x+K*\phi)$" and it is re-synchronised so many times as the wanted information inside the previous electric period $T_e(n)_{TOT}$.

Therefore, by using a such embodiment and referring to the FIG. 5, it is to be noted that in condition of abrupt deceleration the phase angle $\delta$ is lower than the phase angle $\alpha$ and it is also lower than the phase angles $\beta$ and $\gamma$, so as the inventive system further reduces the phase errors of the prior art systems.

Obviously, the phase angle $\phi$ can assume different values, such as, for example, 120° or 60° degrees. This means that the detection of the rotor position is made, respectively, three times or six times inside an electric period $T_e(n)_{TOT}$, that is a finest detection of the rotor position is realised.

Also in this second embodiment, the phase angle can assume a plurality of values according to the following formula:

$$\phi=360°/n \qquad (2)$$

where "n" is the wanted number of information deduced inside the electric period or in a measure period.

Therefore, in the first and in the second embodiment of the present invention, it is necessary detecting two or more rotor positions inside an electric period $T_e(n)$, or inside a measure period.

In the other word, the present invention states that, once detected the rotor angular position and once generated position signal 10 or 14, it is sufficient choosing two or more points inside an electric period $T_e(n)$ or inside a measure period to perform an evaluation of the angular velocity of the rotor of the electric motor. Once deduced said angular velocity, it is possible to generate the driving signal 9 or 13 that copies in the better way the rotor position signal 10 or 14.

Figure 6:
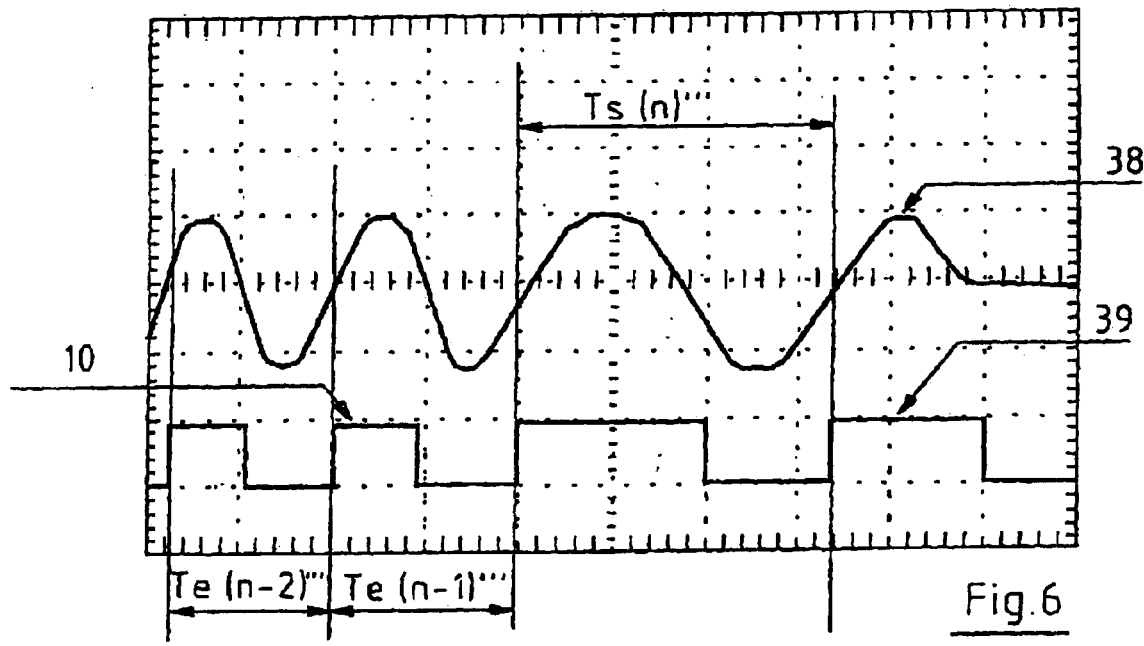
FIG. 6 shows the relationship between a driving signal and the rotor position signal in the case of abrupt deceleration according to a third embodiment of the present invention.

However, in the third embodiment of the present invention a such limitation, that is detecting two or more rotor positions inside an electric period, is not necessary, as described in FIG. 6, wherein the relationship between a driving signal and the rotor position signal in the case of abrupt deceleration according to a third embodiment of the present invention is shown.

As is shown in FIG. 6, the relationship described refers to a system having a sinusoidal driving signal 38 derived by a rotor position signal 39, which provides the information of the deceleration of the rotor of the brushless motor (not shown in FIG. 6).

This third embodiment allows to reduce a phase error during the driving phase 38 of a brushless motor, by means of a measure of an evaluation of the acceleration/deceleration of the rotor of the electric motor.

In fact the Applicant has found that the committed phase errors during the driving of a brushless motor are reduced by means of at least two successive information coming from the rotor position signal, as described in detail hereinafter.

Once deduced such a measure, it is possible to provide the driving signal 38 having a proper period $T_s(n)'''$.

Particularly, the measure of the acceleration of the rotor of the electric motor is deduced by the comparison of two or more successive information deduced by the rotor position signal 39.

In other word, to compute the driving signal $T_s(n)'''$ is sufficient only one information for each electric period $T_e(n)'''$.

In fact, referring again to the FIG. 6, the scanning frequency of the period, or of a fraction of the period, of the driving signal $T_s(n)'''$, is deduced by means of an evaluation of the acceleration of the rotor of the electric motor, for example, according the following formula:

$$T_s(n)'''=[T_e(n-1)'''/T_e(n-2''')]*T_e(n-1)''' \quad (3)$$

The formula (3) states that if the electric period $T_e(n-1)'''$ is equal to the electric period $T_e(n-2)'''$, that is the electric motor has a constant angular velocity, the driving signal $T_s(n)'''$ has a period (or frequency) equal to the electric period $T_e(n-1)'''$, if the duration of the period $T_e(n-1)'''$ is bigger or lower of the period $T_e(n-2)'''$, the period of the driving signal $T_s(n)'''$ is provided by the formula (3) itself, giving the trend of the rotor acceleration/deceleration.

As stated before, the third embodiment does not need of two or more information about the rotor position inside an electric period $T_e(n)'''$, but if these information are available inside an electric period $T_e(n)'''$ or inside more measure period, they can be used to execute a better computation of the acceleration/deceleration of the rotor of the electric motor and to force the driving signal $T_s(n)'''$ to prefixed values so as to guarantee a better timing in the case of a wrong evaluation of the acceleration/deceleration of the rotor.

Figure 7:
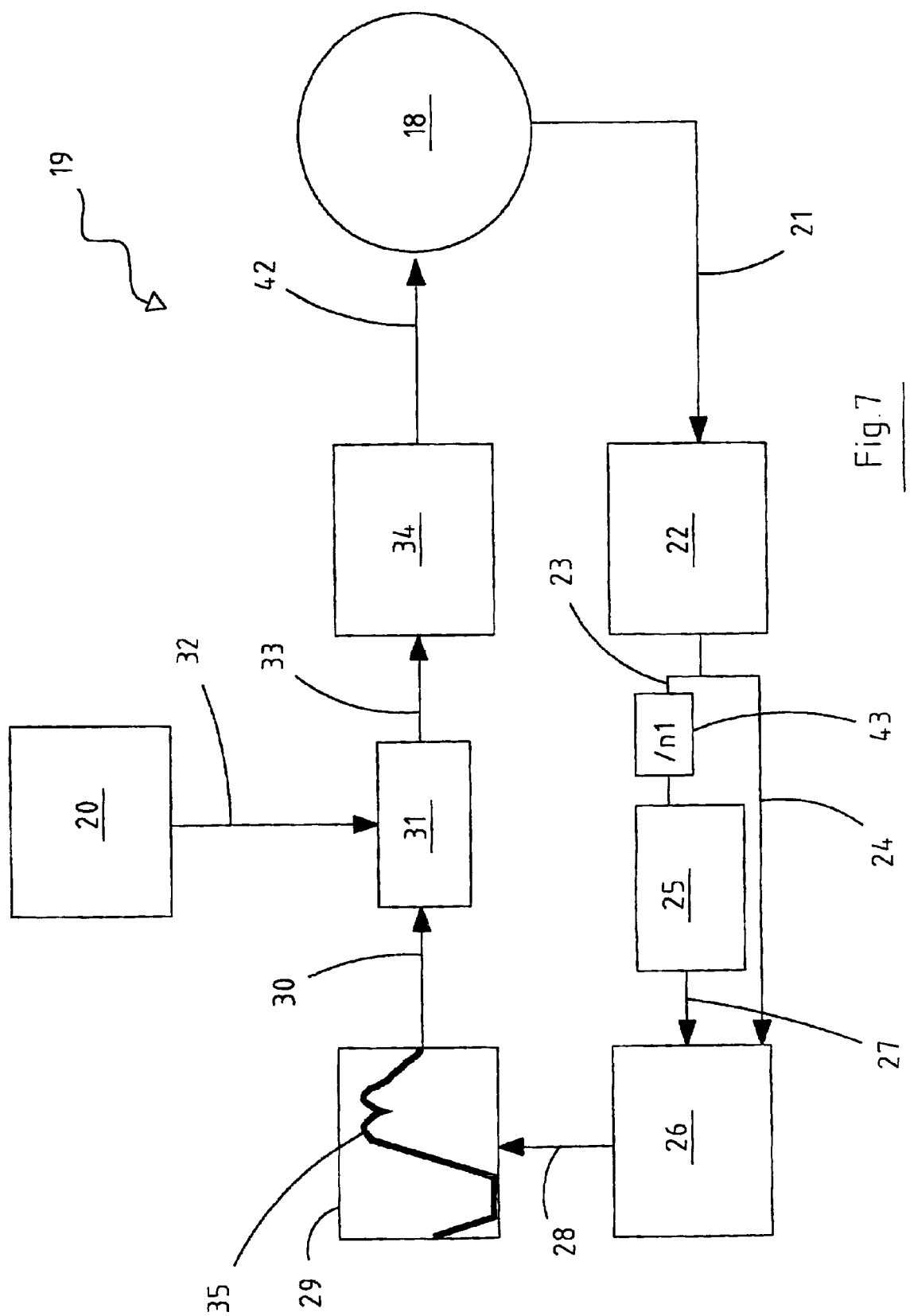
FIG. 7 shows a schematic circuit implementing the first and second embodiments of the present invention.

In FIG. 7 a schematic circuit implementing the first and second embodiment of the present invention is shown.

As shown in such a FIG. 7, a controller block 20 controls a system 19 and an electric motor 18, which is connected to said system 19 by means of a feedback scheme.

In fact the electric motor 18 provides a signal 21 to said system 19 and receives a signal 42 from said system 19.

The signal 21 is in function of the rotor position and it is generated by means Hall effect sensors (not shown in FIG. 7) or by means the motor's BEMF, while the signal 42 is the power signal generated by power switch devices (not shown in FIG. 7).

The system 19 is composed by a rotor position detector 22, which receives said signal 21 and outputs a rotor position signal 23, which is input to a frequency multiplier 25, by means of a divider 43, and it is also input to an address generator 26.

The divider 43 has the function to select the number of useful information inside the rotor position signal 23, in function of which embodiment is been chosen.

The divider 43 uses a constant "n1" to realise the division.

In the case of the first embodiment with two information inside the electric period, "n1" is equal at two, and in the case of the second embodiment "n1" is equal at one. Generalising "n1" is equal at the number of the wanted information inside the electric period.

Said divider 43 outputs a signal 44 that is input to said frequency multiplier 25.

The frequency multiplier 25 generates a signal 27 that represents the scanning frequency of the whole system 19 and said signal 27 is input to said address generator 26.

The address generator 26 outputs a signal 28 that is input to a memory block 29, wherein a predefined number of samples of the driving profile are stored.

The memory block 29 outputs a profile sample signal 30 that is input to gain block 31, able to modify the value of said profile sample signal 30.

The controller 20 provides a multiply coefficient signal 32 that is in input to said gain block 31.

Finally the gain block 31 provides an appropriate signal 33 that represents the right way of working of the electric motor 18 when is powered by the power stage 34.

Particularly, the memory block 29 stores the number of samples of the driving profile 35 and they allow to achieve a sinusoidal differential signal, that is the driving signal, applied to the windings of the electric motor 18.

The address generator block 26 allows selecting one of the various samples of the driving profile 35 stored in the memory block 29.

The scanning frequency signal 27 allows to scan the various samples of the driving profile 35, that is the various rotor position information stored in the memory block 29 by means of the proper frequency of the signal 27.

In fact the rotor position signal 23 shows the sample of the driving profile 35 from which the scanning of the samples in the memory block 29 has to start.

Particularly, the frequency multiplier 25 multiplies the frequency of the rotor position signal 23 for an opportune value, so as to scan at the proper velocity a given section of the driving profile 35.

Particularly, the gain block 31 modifies the amplitude of the driving profile 35 so as to control the velocity of the rotor of the electric motor 18, and the controller block 20, by means of the signal 32, gives the multiplying coefficient.

By way of example, if the driving profile 35 is stored in thirty-six samples inside the memory block 29 and if the detection of the rotor position is made two times inside an electric period $T_e(n)$, that is two rotor positions or phase angle φ=180°, in the case of the first embodiment of the present invention, the rotor position signal 23, having two information, is input to the address generator 26, so as to indicate the first and the second point in which made the re-synchronisation, and in the same time the rotor position signal 23 is divided by two, that is "n1=2", so as to obtain the time duration of one electric cycle of the motor, that is signal 44, and whereas the scanning time, that is signal 27, is given by the time duration of one electric cycle of the motor, that is signal 44, multiplied for the number of the samples stored in the memory block 29:

$$Tscan=T_{electric\ cycle}*36 \quad (4)$$

The equation (4) states that all the samples of the driving profile 35 stored in the memory block 29 have to be scanned inside an electric period $T_e(n)$.

By way of further example, if the driving signal 35 is stored in thirty-six samples inside the memory block 29 and if the detection of the rotor position is made two times inside an electric period $T_e(n)$, that is two rotor position or phase angle φ=180°, in the case of the second embodiment of the present invention the scanning time signal 27 is given by the time of the previous half electric period 44 of the motor, being "n1=1", divided for the half number of the samples stored in the memory block 29:

$$Tscan=T_{half\ electric\ cycle}/18 \quad (5)$$

The equation (5) states that half of the samples of the driving profile 35 stored in the memory block 29 have to be scanned inside a half electric period $T_e(n)$.

In the FIGS. 4, 5 and 6 the number of the rotor position information for each electrical period of the motor is equal to n=2 and, generalising, if there are "n" rotor position information for every electric period $T_e(n)$, therefore the "n" positions can be associated to "n" samples of the driving signal 35 from which the scanning has to start.

By elementary considerations it is obvious extending the first and second embodiment of the present invention to the case in which the driving profile 35 is made by a number of samples different of thirty-six and in the case of the detection of the rotor position is made by a phase angle φ different by 180° degrees.

Figure 8:
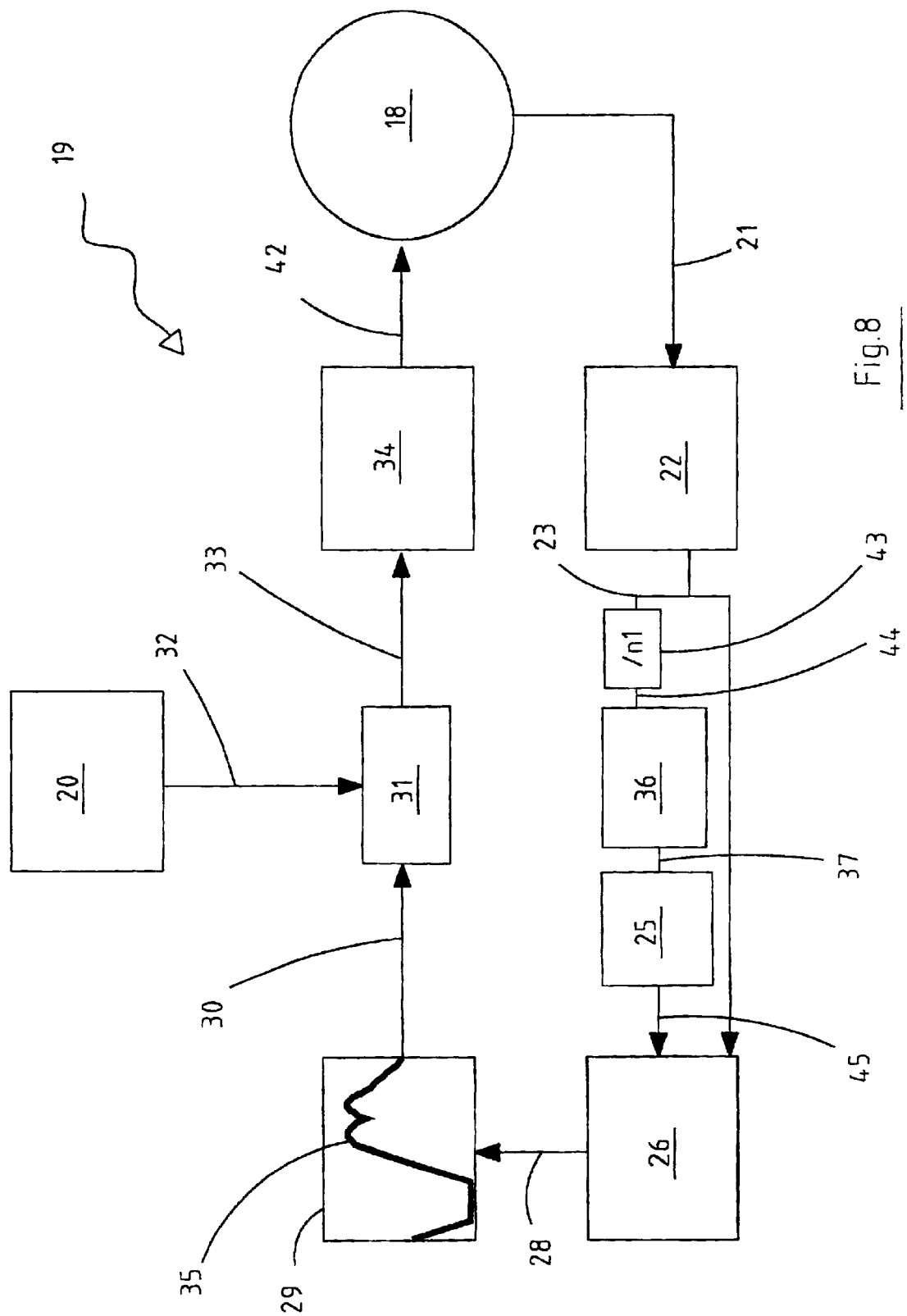
FIG. 8 shows another schematic circuit implementing the third embodiment of the present invention.

Wherever possible, the same reference numbers and the description to refer to the same or like parts are used in FIG. 8.

In FIG. 8 another schematic circuit implementing the third embodiment of the present invention is shown.

With respect to the FIG. 7 the circuit shown in FIG. 8 is modified only for the signal that input the frequency multiplier 25.

In fact, the system 19 is now composed by a rotor position detector 22, which receives said signal 21 and outputs the rotor position signal 23, one of which is input into a speed estimator block 36, by means of the divider 43, and it is also input to an address generator 26.

The speed estimator block 36 generates a signal 37 that represents the estimated velocity of the rotor of the electric motor 18 and said signal 37 is input to said frequency multiplier 25.

The frequency multiplier 25 generates a signal 45 that represents the scanning frequency of the whole system 19.

In this way the speed estimator 36 estimates the actual velocity of the rotor of the electric motor 18 and said frequency multiplier 25 uses these information to determine the timing of scanning of the various samples of the driving profile 35 stored in the memory block 29, as already described in FIG. 7.

What is claimed is:

1. Method for minimising phase errors during the driving of an electric motor having a stator winding, a permanent magnet rotor assembly, and devices able to sense a position of the rotor, said method comprising the steps of:
   generating a rotor position signal using said devices able to sense said position of the rotor;
   detecting n information of said position of the rotor from n edges of said rotor position signal during one electric period of the electric motor, where n≧2; and
   generating a driving signal for driving the electric motor as a function of said n information of said position of the rotor that are detected during the electric period, so as to follow the rotor velocity,
   wherein the step of generating said driving signal includes the sub-step of:
      each time one of said n information of said position of the rotor is detected, forcing said driving signal to: i) assume a value that re-synchronizes said driving signal with said rotor position signal, and ii) assume a frequency based on the previous 1/n period of said rotor position signal.

2. Method for minimising the phase errors according to claim 1, wherein said n edges are successive edges of said rotor position signal.

3. Method for minimising the phase errors according to claim 1, wherein said n edges include at least one rising edge and at least one falling edge of said rotor position signal.

4. Method for minimising the phase errors according to claim 1, wherein in the sub-step of forcing said driving signal, said driving signal is forced to assume a 1/n period that is equal to the previous 1/n period of said rotor position signal.

5. Method for minimising the phase errors according to claim 1, wherein in the sub-step of forcing said driving signal, said driving signal is forced to assume a frequency as a function of an estimation of the acceleration of the rotor.

6. Method for minimising the phase errors according to claim 1, wherein said driving signal has a sinusoidal shape of the type sin(x+K*φ), wherein K is a constant and φ is the phase angle between at least two of said n information of said position of the rotor.

7. Method for minimising the phase errors according to claim 6, wherein said phase angle (φ) is equal to a round angle divided by n.

8. Circuit for minimising phase errors during the driving of an electric motor having a stator winding and a permanent magnet rotor assembly, said circuit comprising:
   detecting means able to detect a position of the rotor and output a rotor position signal, said detecting means detecting n information of said position of the rotor during one electric period of the electric motor, where n≧2;
   storing means able to store a number of samples of an ideal driving profile;
   addressing means able to address one of said stored samples in said storing means;
   frequency multiplier means able to provide a scanning frequency signal based on said rotor position signal, said scanning frequency signal being supplied to said addressing means so as to scan said stored samples of said ideal driving profile in said storing means; and
   power means able to provide a driving signal for driving the electric motor as a function of said samples of said ideal driving profile scanned from said storing means,
   wherein each time one of said n information of said position of the rotor is detected by said detecting means, said power means re-synchronizes said driving means with said rotor position signal, and forces said driving signal to assume a frequency based on the previous 1/n period of said rotor position signal.

9. Circuit for minimising the phase errors according to claim 8, wherein said rotor position signal is used by an acceleration determination means to make an evaluation of the acceleration of the rotor, said acceleration determination means including a series of a divider, a speed estimator means, and said frequency multiplier means.

10. Circuit for minimising the phase errors according to claim 8,
   wherein said detecting means detects two information of said position of the rotor from two edges of said rotor position signal during one electric period of the electric motor, and
   each time one of said two information of said position of the rotor is detected by said detecting means, said power means forces said driving signal to assume a half period that is equal to the previous half period of said rotor position signal.

11. Circuit for minimising the phase errors according to claim 10, wherein said detecting means detects said n information of said position of the rotor from n edges of said rotor position signal during one electric period of the electric motor, said n edges including at least one rising edge and at least one falling edge of said rotor position signal.

12. Circuit for minimising the phase errors according to claim 10, wherein said power means re-synchronizes said driving signal with a scanning frequency provided by said frequency multiplier means.

13. Circuit for minimising the phase errors according to claim 10, wherein said power means forces said driving signal to assume a frequency by the series of said frequency multiplier means and said speed estimator means.

14. Circuit for minimising the phase errors according to claim 10, wherein said driving signal is a sinusoidal driving signal having a sinusoidal shape of the type sin(x+K*φ), wherein K is a constant and φ is equal to a round angle divided by n.

15. System for driving an electric motor having a stator winding and a permanent magnet rotor assembly, said system comprising:
- rotor position detection means for detecting a position of the rotor and generating a rotor position signal;
- means for detecting n information of said position of the rotor from n edges of said rotor position signal during one electric period of the electric motor, where n≧2; and
- power means for generating a driving signal for driving the electric motor as a function of said n information of said position of the rotor that are detected during the electric period, so as to follow the rotor velocity,
- wherein each time one of said n information of said position of the rotor is detected by the means for detecting, said power means forces said driving signal to: i) assume a value that re-synchronizes said driving signal with said rotor position signal, and ii) assume a frequency based on the previous 1/n period of said rotor position signal.

16. System according to claim 15, wherein said n edges include at least one rising edge and at least one falling edge of said rotor position signal.

17. System according to claim 15, wherein each time one of said n information of said position of the rotor is detected by the means for detecting, said power means forces said driving signal to assume a 1/n period that is equal to the previous 1/n period of said rotor position signal.

18. System according to claim 17, wherein said driving signal is forced to assume a frequency as a function of an estimation of the acceleration of the rotor.

19. System according to claim 15, wherein said driving signal has a sinusoidal shape of the type sin(x+K*φ), with K being a constant and φ being equal to a round angle divided by n.

20. Method for minimising phase errors during the driving of an electric motor having a stator winding and a permanent magnet rotor assembly, said method comprising the steps of:
- detecting a position of the rotor and outputting a rotor position signal,
- detecting n information of said position of the rotor from n edges of said rotor position signal during one electric period of the electric motor, where n≧2;
- storing a number of samples of an ideal driving profile;
- using a frequency multiplier to generate a scanning frequency signal based on said rotor position signal;
- using said scanning frequency signal to address said stored samples of the ideal driving profile so as to scan said stored samples of said ideal driving profile;
- generating a driving signal for driving the electric motor based on said scanned samples of said ideal driving profile; and
- each time one of said n information of said position of the rotor is detected, re-synchronising said driving signal with said rotor position signal, and forcing said driving signal to assume a frequency based on the previous 1/n period of said rotor position signal.

21. Method for minimising the phase errors according to claim 20, further comprising the step of evaluating the acceleration of the rotor based on said rotor position signal.

22. Method for minimising the phase errors according to claim 20, wherein two information of said position of the rotor are detected from two edges of said rotor position signal during one electric period of the electric motor, and
- each time one of said two information of said position of the rotor is detected, said driving signal is forced to assume a half period that is equal to the previous half period of said rotor position signal.

23. Method for minimising the phase errors according to claim 22, wherein said n edges include at least one rising edge and at least one falling edge of said rotor position signal.

24. Method for minimising the phase errors according to claim 1,
- wherein n=2, and
- in the sub-step of forcing said driving signal, said driving signal is forced to assume a half period that is equal to the previous half period of said rotor position signal.

* * * * *